United States Patent [19]

Hirs

[11] 3,953,333
[45] Apr. 27, 1976

[54] METHOD AND APPARATUS FOR REJUVENATING A BED OF GRANULAR FILTER MEDIUM

[75] Inventor: Gene Hirs, Birmingham, Mich.

[73] Assignee: Hydromation Filter Company, Livonia, Mich.

[22] Filed: Apr. 21, 1975

[21] Appl. No.: 570,138

[52] U.S. Cl. .................................... 210/74; 210/80; 210/82; 210/279; 210/290
[51] Int. Cl.² ........................................ B01D 41/02
[58] Field of Search .................. 210/35, 74, 80, 82, 210/274, 275, 279, 290, 293, 434

[56] References Cited
UNITED STATES PATENTS

| | | | |
|---|---|---|---|
| 2,773,829 | 12/1956 | Hunting .................................. | 210/35 |
| 3,550,774 | 12/1970 | Hirs et al. ............................. | 210/80 X |
| 3,695,433 | 10/1972 | Hirs et al. ............................. | 210/80 X |
| 3,814,245 | 6/1974 | Hirs ....................................... | 210/80 X |
| 3,814,247 | 6/1974 | Hirs ....................................... | 210/80 |

*Primary Examiner*—Charles N. Hart
*Assistant Examiner*—Robert H. Spitzer
*Attorney, Agent, or Firm*—Cullen, Settle, Sloman & Cantor

[57] ABSTRACT

The disclosed method and apparatus relate to the rejuvenation of a bed of granular filter medium which has accumulated particulate and lint contaminants during filtration flow of dirty liquid. The method first includes the step of agitating the filter bed to break-up contaminants which have become agglomerated. The agitating step includes flowing the filter granules and the contaminants in a liquid mixture slurry from the filter bed housing through a closed flow path and then back to the filter housing. The bed is then at least partially reformed, with the finer particulates and lint being in the upper portion of the bed and the larger particulates being in the lower portion of the bed. Then, the upper portion of the bed is expanded and backwashed to remove the finer particulate contaminants and lint. At the same time, the lower portion of the bed and the heavier contaminants flow in a liquid mixture through a cleaning element to remove those heavier contaminants. The apparatus includes a closed recirculation flow path extending from an upper portion of the filter housing to a lower portion of the filter housing to accomodate the agitating step. A second closed flow path extends from the bottom of the housing to the cleaning element and back to a point spaced from the bottom of the housing, so that only the lower portion of the bed, with little or no lint, passes through the cleaning element during the contaminant removal step.

16 Claims, 2 Drawing Figures

METHOD AND APPARATUS FOR REJUVENATING A BED OF GRANULAR FILTER MEDIUM

BACKGROUND OF THE INVENTION

1. Field of the Invention

The present invention relates generally to the field of filtration, and more specifically to a method and system for cleaning a bed of granular filter medium which has become clogged by the accumulation of contaminants.

2. The Prior Art

Various types of methods and systems have been used in the prior art to remove accumulated contaminants from a bed of granular filter medium. One such cleaning mechanism has provided numerous advantages over prior art cleaning mechanisms and is disclosed in U.S. Pat. No. 3,550,774, which is incorporated herein by reference. One embodiment of the cleaning mechanism disclosed in the previously mentioned patent includes a cylindrical wedge wire screen, which a slurry of filter granules and dirt is passed for the removal of the dirty particles. Even though this cleaning element has provided numerous advantages over previous prior art cleaning mechanisms, it has been found that lint-like contaminants become entangled in the wedge wire, thereby requiring disassembly of the cleaning element for manual removal of the entangled lint.

The present invention is directed in part, to the elimination of the entanglement of lint-like contaminants in the wedge wire component, thereby eliminating the "down-time" for cleaning. Other advantages which are inherent in the disclosed and claimed invention will be apparent of those of ordinary skill in the art. Other examples of prior art rejuvenation techniques are disclosed in applicant's U.S. Pat. Nos. 3,814,245 and 3,814,247.

SUMMARY OF THE INVENTION

The method of this invention includes the accumulation of contaminants such as particulate material, tramp oils, and lint in a bed of granular filter medium. In many instances, the particulate contaminants become agglomerated within the bed of filter medium to form a "filter cake" which must be broken up before the bed can be rejuvenated. Thus, the first step in the improved method may include expanding and violently agitating the filter bed, thereby breaking up the filter cake into filter granules and particulate contaminants. Thereafter the filter bed is reformed with the lint contaminants predominately in the upper portion of the reformed bed, the larger of the broken-up particulate contaminants in the lower most portion of the bed, and the remainder of the particulate contaminants interspersed throughout the bed. Next, several steps are conducted simultaneously to separately remove the various types of contaminants in order to reduce the likelihood that the lint contaminants will become entangled in the cleaning element used in the present invention. Those simultaneous steps include: (a) introducing a diluting liquid into the bed at a position above the bottom of the bed yet spaced well below the top of the bed; (b) flowing a portion of the diluting liquid upwardly through the upper portion of the bed at an appreciable velocity to expand that portion of the bed; (c) removing contaminants from the expanded portion of the bed with the upwardly flowing liquid; and (d) withdrawing the remainder of the diluting liquid mixed with granular filter material and larger particulates from the bottom of the bed as a slurry, flowing the slurry in a continuous flow path over a cleaning element where interspersed larger particulates are removed from the slurry, and returning the withdrawn filter material back to the filter bed. After a sufficient quantity of contaminants have been removed from the filter bed, the diluting liquid flow is terminated and the filter bed is reformed for further filtration flow.

In a preferred embodiment of the invention, the filter bed is initially agitated for breaking up the filter cake by flowing liquid upwardly through the bed at a high velocity to form a slurry which includes the filter bed and entrapped contaminants. The slurry is then conducted in a continuous flow path which is in part exterior to the filter housing.

The amount of diluting liquid which is introduced into the bed during the simultaneous removal of the various types of contaminants should be selected to account for the following consideration: (1) The portion of the diluting liquid which flows upwardly should have a velocity which is sufficient to expand the upper portion of the bed in order to remove the interspersed contaminants; yet that velocity should not be so great that filter granules will be removed from the filter bed. (2) The velocity of the upwardly flowing liquid portion should be great enough to flush dirt and lint upwardly out of the expanded filter bed; (3) Sufficient liquid must be supplied to slurry the lower bed portion.

A preferred embodiment of the fitration apparatus and system includes a filter housing for a bed of granular filter material through which dirty liquid flows for the removal of entrained contaminants. A closed recirculation flow path is provided exterior to the housing to form a loop which extends from an outlet at an upper portion of the housing to a return inlet at a lower portion of the housing. Liquid supply means inject diluent liquid into the bottom of the bed of granular filter medium at an appreciable velocity to form a flowable liquid mixture which is conducted through the closed recirculation flow path loop for agitating the mixture and breaking up some of the agglomerated contaminants. During this phase of operation, all the filter material in the housing is recirculated. A pump is included in the closed recirculation loop for returning the liquid mixture back to the filter housing so that the bed may be reformed with the lint contaminants principally in the upper portion of the bed and the larger particulate contaminants principally in the bottom of the bed.

A second closed flow path exterior to the housing includes a cleaning element for the removal of the larger contaminants. This second closed flow path also includes an outlet at the bottom of the housing which is connected to the cleaning element and then to an inlet return positioned above the bottom of the housing. The inlet return is spaced well below the top of the filter bed, so that filter material may be withdrawn from the bottom of the bed and then be returned in a continuous recirculation path to a point below the top of the bed in order to limit the amount of filter material withdrawn. A second liquid supply means is provided to inject liquid into the filter bed through the return inlet of the second closed flow path for the removal of the contaminants. This second supply means injects liquid into the bed at an appreciable velocity sufficient to expand and substantially suspend the portion of the filter bed which is above the return inlet. However, the top portion of the bed is not withdrawn for flow through the second closed flow path. This enables particulate and lint contaminants to be flushed from that portion of the bed. A portion of the liquid from the second supply means flows downwardly to provide a liquid mixture to remove the filter granules at the bottom of the bed from the housing for flow through the second closed flow path. A pump in the second closed flow path directs the liquid mixture through the cleaning element to remove the contaminants and then back to the fiter housing.

In a more preferred embodiment of the apparatus, the two closed flow paths include a common flow line portion and pumping means. In an even more preferred embodiment, the two closed flow paths include a common return inlet which is spaced from the bottom of the bed by a distance of up to about 30% of the bed depth.

Although the invention has been summarized as including a method and apparatus for removing particulate and lint contaminants from a bed of granular filter medium, other uses within the scope of the invention may become apparent to those in the filtration art.

DETAILED DESCRIPTION OF THE PREFERRED EMBODIMENT

One of the purposes of the present invention is to minimize or eliminate the entanglement of lint-like contaminants in a cleaning element which separates particulate contaminants from filter medium. The terms "lint-like contaminants" or "lint" are used herein in a very generic sense to include fibers, strings, soft down of raveled linen and other such contaminants which might accumulate in a granular medium cleaning element.

Figure 1:
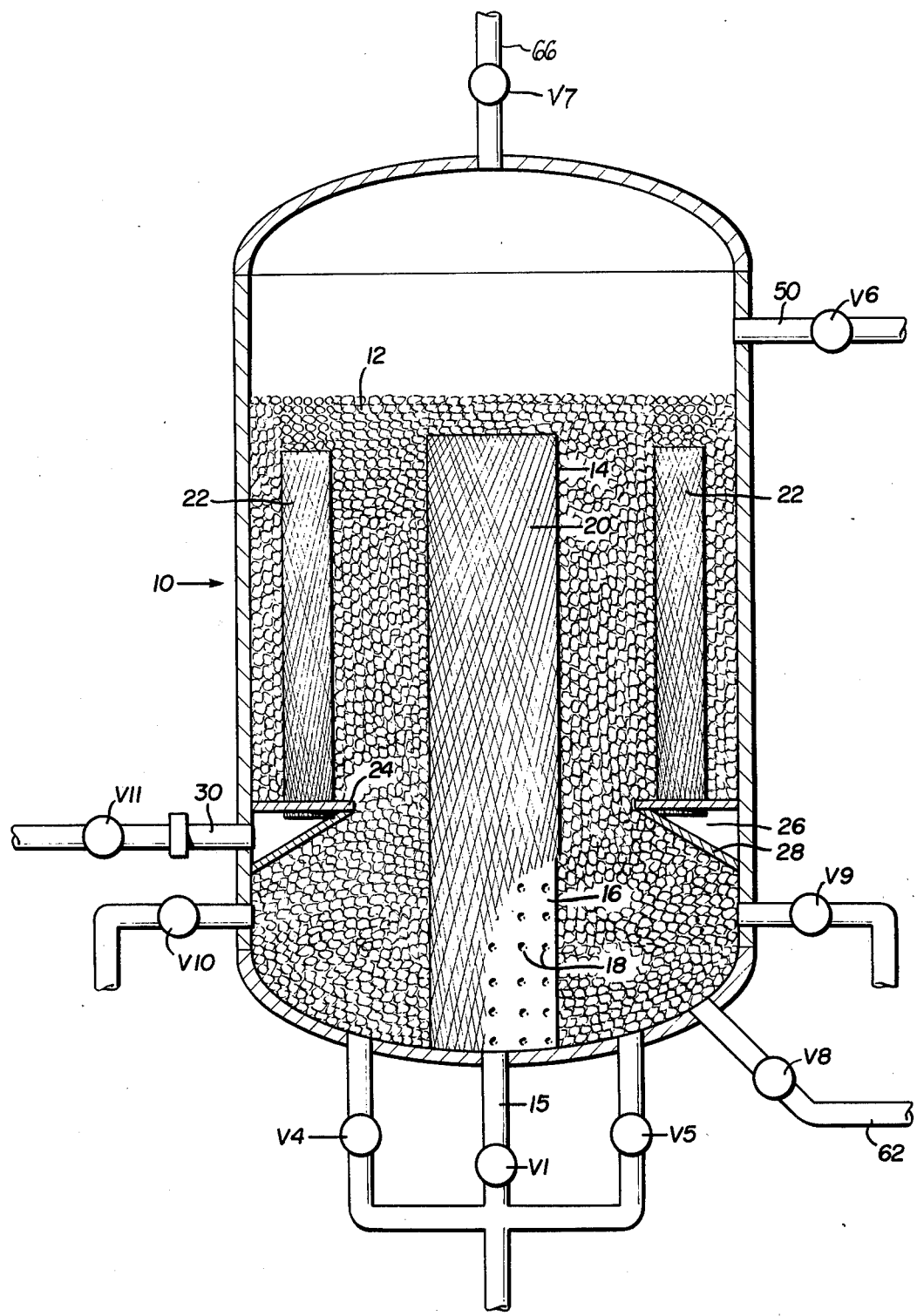
FIG. 1 is a schematic vertical sectional view through a filter vessel which forms a part of the present invention.

Referring to FIG. 1, a filter vessel 10 is illustrated for housing a bed 12 of granular filter medium. The filter housing is of conventional, standard high pressure design having convex, domed upper and lower walls. In the preferred embodiment, the granular filter medium of bed 12 is comprised of 20/30 mesh or 12/20 mesh granulated black walnut shells. It will be understood, however, that the particular size or material for use in the present invention is not critical. The primary considerations for selecting a suitable granular filter material should include the following factors: (1) the specific gravity of the granular filter material should be low enough to enable the granules to be expanded and slurried for breaking up the filter cake and removing the interspersed contaminants; (2) if tramp oils are in the dirty liquid flow, the filter material should have the ability to remove the tramp oil and then to release the tramp oil during the contaminant removal steps; and (3) the granular filter material should be fracture resistant and durable to withstand the recirculation and backwashing procedures contemplated by the present invention.

The space above the bed of granular filter material, as illustrated in FIG. 1, should be sufficient to enable the bed to be expanded during the backwashing procedures. It will be understood, of course, that any suitable filter housing may be utilized for confining the bed of granular filter material.

The filter vessel 10 also includes a central inlet 14 for the introduction of contaminated liquid from a flow passageway 15. In the disclosed embodiment, inlet 14 includes a tube 16 formed from standard pipe section of stainless steel or other material capped at the upper end and provided with a plurality of radial perforations 18. A stainless steel mesh wire 20 surrounds the tube 16 forming a tight mesh which will allow the passage of contaminated liquid and against which the granular filter material will accrete. Such mesh screens are of conventional construction in the art; and therefore a further description is considered unnecessary. It will be understood, of course, that the description of the inlet is exemplary of a preferred embodiment and that other feed inlets may be utilized. For example, the mesh wire might be eliminated in the event that certain types of contaminants become entangled therein.

The contaminated liquid will pass from inlet 14 radially into the bed of granular filter medium for the removal of contaminants, which may include particulates, lint, and possibly tramp oils. A plurality of radially arranged outlet tubes 22 are provided in the vessel to receive the clarified liquid after passing through the filter material. These tubes may be substantially identical in structure to tube 14, except smaller. Alternatively, the tubes may be formed of spirally wound wedge wire as disclosed in U.S. Pat. No. 3,550,774.

In the disclosed embodiment, outlet tubes 22 are mounted on an annular ledge 24 in the vessel and communicate by appropriate openings in the ledge with an annular outlet flow channel 26. This flow channel is defined by ledge 24 and a downwardly directed structural member 28 which may be integral with ledge 24. Therefore, clarified liquid flows into tubes 22, downwardly through the tubes into the annular chamber 26 and out of the vessel 10 through a flow conduit 30 and opened valve V-11.

This particular type of filtration arrangement is simply a preferred embodiment. An alternative arrangement for the filter is disclosed in U.S. Pat. No. 3,550,774. Another alternative arrangement for the radially arranged filter tubes is included within the disclosure of Ser. No. 188,246, filed Oct. 12, 1971, and now abandoned. An even further alternative arrangement might simply include a bed of granular filter medium, through which liquid flows vertically for the removal of the contaminants.

Figure 2:
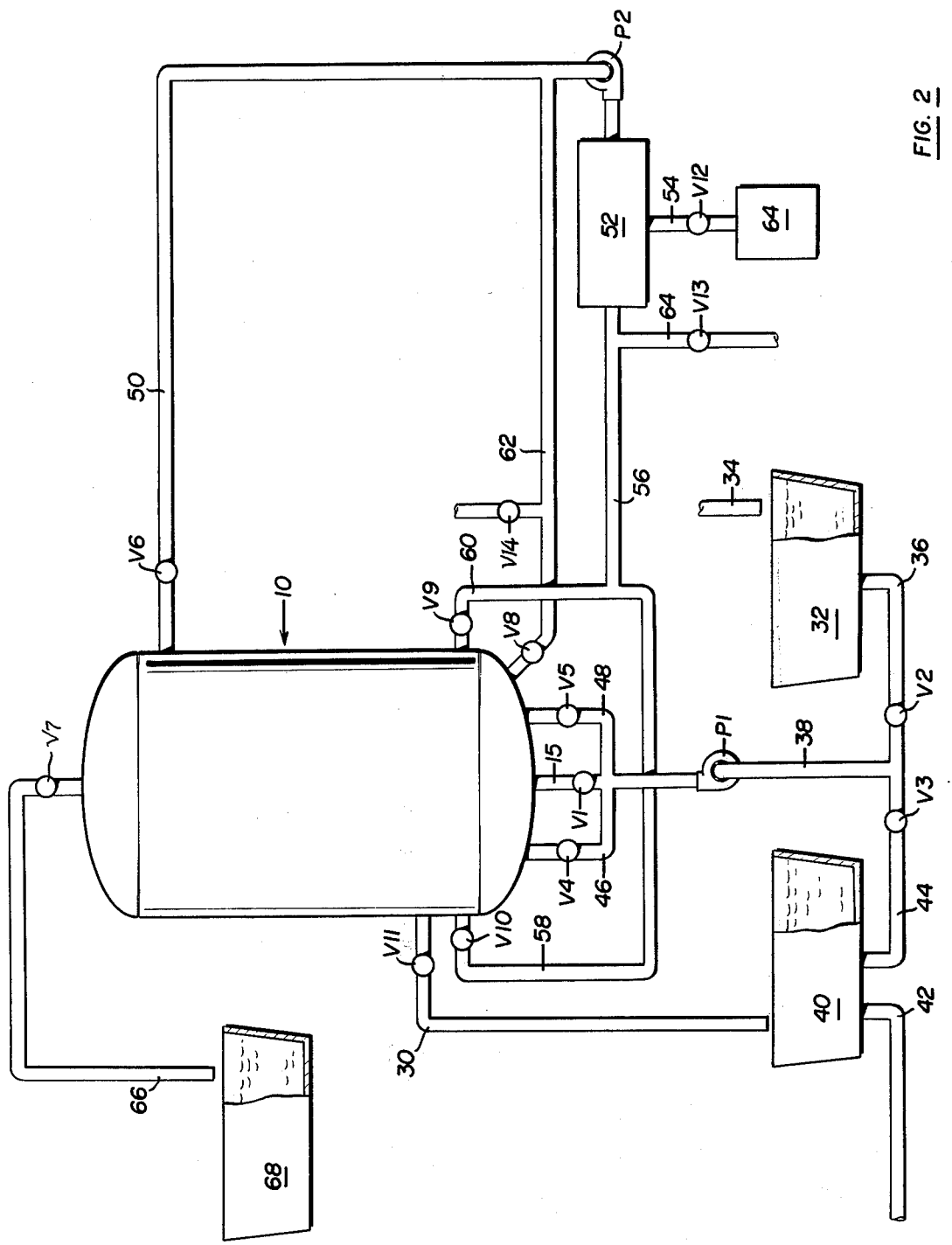
FIG. 2 is a schematic illustration of the flow line system of the present invention for supplying contaminated liquid to the filter vessel and for thereafter rejuvenating the granular filter medium.

Referring now to FIG. 2, filter vessel 10 is shown as a component of an overall filtration and backwash system. As previously described, contaminated liquid enters the filter vessel by flow through pipe section 15. This contaminanted liquid is stored, for example, in a reservoir tank 32 which receives the dirty liquid from industrial machines by way of a suitable supply conduit 34. During filtration flow, the contaminated liquid is pumped by pump P1 from tank 32 through flow pipe sections 36, 38, and 15 and opened valves V1 and V2. Other valves V3-V10, V12, and V13, which will be disclosed in greater detail below, are closed during the filtration cycle so that the liquid flow is from tank 32, into the filter vessel, out of the filter vessel by way of pipe 30, and then into a reservoir 40. The clarified liquid in reservoir 40 may be pumped back to the appropriate industrial application as desired by a flow pipe 42.

The filter bed 12 has a tolerance for contaminants which results in its becoming very heavily loaded with dirt while still remaining permeable to the flow of liquid therethrough. However, bed 12 will eventually become loaded with the contaminants and require rejuvenation. The necessity for such rejuvenation may be signaled by the rise of back pressure in flow line 15, which can be measured by a single pressure gauge installed in that flow line. Other suitable means for initiating the rejuvenation cycle might include lapse time, measuring flow from the filter housing, a turbidity monitoring system for outlet line 30, or the like. Any such detection means could sound an alarm, give a visual indication or even automatically initiate the filter cleansing and rejuvenation cycle.

According to the present invention, the filter bed 12 is rejuvenated in two stages, by: (1) agitating the granular filter bed to break up the accumulated contaminants, for example, by recirculating the filter granules and contaminants in a slurry flow through a continuous flow path exterior to the filter housing; and then (2) simultaneously (a) recirculating only a portion of the filter bed past a perforated element to remove the larger of the particulate contaminant; and (b) expanding and backwashing the other portion of the bed to remove the contaminants accumulated within that portion of the bed. That rejuvenation process and system will now be fully explained.

When rejuvenation or cleaning of the filter bed becomes necessary, valves V1, V2 and V11 are closed and the supply of contaminated dirty liquid to the filter vessel 10 is halted. At or about the same time valves V3, V4, V5, V6, V9, and V10 are opened. As a result, pump P1 delivers clean diluent liquid into the filter tank 10 from tank 40 through opened valves V3, V4, and V5 and flow pipe sections 44, 38, 46 and 48 to initiate the recirculation and agitation cycle. Of course, diluent liquid could simply be supplied from tank 32. The diluent liquid is introduced into the filter bed under relatively high pressure and in such volume and velocity as to first expand the filter bed 12 and then to suspend the bed and the embedded contaminants into a slurry. This liquidous slurry with admixed filter medium and contaminants rises up into the upper domed portion of the filter housing and exits through an outlet connection and flow pipe 50, which is above the normal level of bed 12.

The slurry flows through pipe 50 to a pump P2, which is of centrifugal type, so that the slurry is agitated even further into individual filter medium granules and dirt particles suspended in the diluent liquid. The slurry then flows through pump P2 and through a cleaning receptable and cleaning element which is schematically indicated by reference numeral 52. This receptacle is fully disclosed in U.S. Pat. No. 3,550,774, which is incorporated herein. Therefore, it is believed that a further description of that element is not required here. It is at this point that the present invention differs from the invention disclosed in U.S. Pat. No. 3,550,774. Specifically, valve V12 in pipe section 54 is closed at this point in operation, so that no contaminants are removed. The slurry in this phase of operation merely flows past the cleaning receptacle 52 and back to the filter vessel 10 through pipe sections 56, 58 and 60 through opened valves V9 and V10. The primary purpose for the recirculation flow through pipe section 50 and back to the filter housing is to break up the accumulated and agglomerated contaminants for their later removal. This recirculation can continue as long as is necessary or desired to sufficiently fragment the contaminants for purposes to be later explained.

After a sufficient recirculation and breaking up of the agglomerated contaminants, this phase of operation is terminated by first closing valve V6. The remaining slurry in flow line 50 is delivered back to the filter housing by pump P2. For this purpose it may be necessary to provide a liquid supply means (not shown) immediately "down stream" of valve V6 to assure that no filter granules or contaminants remain in that flow line section. After all the filter material and contaminants are returned to the housing 10, valves V9 and V10 may be closed and pump P2 deenergized.

Even before valves V9 and V10 are closed, it may be necessary to close valves V3, V4 and V5 and to deenergize pump P1. As discussed previously, no liquid is being withdrawn through the cleaning element during the recirculation cycle. Therefore, it may be necessary to limit the quantity of liquid introduced into the filter housing by P1. Accordingly, the supply of diluent liquid by pump P1 may be provided long enough simply to expand and slurry the filter bed to begin the flow of the liquid slurry through the closed loop recirculation flow path. After the delivery of diluent liquid has been halted through pump P1, the recirculation can be continued by the return of the slurry back to the housing 10 at an appreciable velocity as a result of the flow imparted to the slurry by pump P2.

After all the slurry has been returned to the housing at the termination of the recirculation cycle, the solids will settle within a short period of time. As will be appreciated by those skilled in the art, the heavier and larger contaminants will settle to the bottom portion of the bed to become interspersed with filter medium. The lighter and smaller particulates, as well as the lint-like contaminants, will be predominently interspersed in the granular medium in the upper portions of the bed. During this settling process, the liquid level may be well above the upper level of the settled filter bed. With the particulate contaminants having been fragmented and the filter bed substantially reformed, the cleaning cycle may be initiated.

The rejuvenation of the filter bed is accomplished by opening valves V7, V8, V9, V10, V12, and V13. By opening valve V13, diluting liquid is injected through flow line 64, 56, 58 and 60 into the filter bed for two purposes to be explained in greater detail below: (1) a portion of the diluting liquid is used to form a flowable mixture or slurry of material at the bottom of the bed; and (2) the remainder of the diluting liquid flows upwardly to expand the upper portion of the bed, to backwash interspersed contaminants.

By opening valve V8, filter medium and the larger particulate contaminants in the bottom portion of the bed are withdrawn from the bottom of the vessel in a flowable liquid mixture or slurry, through pipe 62. This flowable liquid mixture flows to pump P2 and through cleaning receptable 52, flow pipe section 58 and 60 and back into the housing 10. It will be noted that during this phase of operation, valve V12 is opened, so that particulate contaminants are removed in a liquid flow through the apertures in the cleaning element and deposited in a storage vessel 64. The operation of the cleaning receptable 52 is fully disclosed in U.S. Pat. No. 3,550,774 and is not considered necessary here However, by way of brief summary, pump P2 flows the liquid into the cleaning receptable past a screen element with appreciable velocity and with an amount of kinetic energy sufficient to keep the granules flowing past apertures in the cleaning element. Withdrawal of liquid through those apertures is due to the difference in pressure across the openings. Further, the granules present a much larger surface area to the liquid flow than do the smaller dirt particles. The granules tend to be swept along in the liquid flow and to pass the screen openings, due to (1) the larger granule size, and (2) the high velocity flow of granules. As more fully explained in U.S. Pat. No. 3,550,774, the apertures in the cleaning element may be smaller or larger than the filter granules. By balancing the factors of aperture size and particle velocity, the greatest cleaning effect can be obtained with minimum probability of granule loss.

It will be understood of course, that the disclosed cleaning element is a preferred embodiment. Other suitable cleaning members may be used for the disclosed invention.

Thus, it will be seen that the filter medium granule component of the slurry passes through the closed path defined by conduit 62, pump P2 the separtion of cleaning receptable 52, the output conduit 56 and branch inlet pipes 58 and 60 back to the vessel 10. A portion of the liquid phase of the slurry and dirt suspended in that portion is withdrawn by cleaning element 52 through the conduit 54 and the adjustable valve V12. In this manner, a separation of particulate contaminants from filter medium is effective at the receptable 52.

It should be noted that pipe sections 58 and 60 return the filter material at a point spaced from the bottom of the filter housing, whereas pipe section 62 is connected to the bottom of the housing. As a result, filter material is taken from the bottom of the vessel and returned to a higher region in the filter bed. In this manner the filter material recirculated for cleaning will be substantially restricted to the bottom or lower portion of the filter bed. This will be the filter material which includes the heavier and larger particulate contaminants and very little, if any, lint.

It will be understood that FIG. 1 is merely a schematic of the vessel and that the spacing of the return sections 58 and 60 from the bottom of the vessel will be chosen in accordance with the type contaminants being filtered. For example, return inlets 58 and 60 may be positioned from the bottom of the vessel by a distance which is up to approximately 30% or more of the bed depth. For many filter materials and dirt sizes, the return inlets 58 and 60 may be positioned a distance from the bottom of a housing which is between about 10 to 25% of the filter bed depth.

As briefly discussed above, the upper portion of the filter bed is expanded for the removal of contaminants simultaneously with the withdrawal and recirculation of the filter medium from the bottom of the bed. This is accomplished in the disclosed preferred embodiment by supplying a sufficient quantity of diluent liquid by flow pipe section 64 to (a) form the flowable liquid mixture from the bottom of the bed through pipe section 62, (b) enable the withdrawal of contaminants in the liquid flow through pipe section 54, and (c) provide a sufficient quantity of liquid to flow upwardly to expand the upper portion of the filter bed for the removal of interspersed fine contaminants and lint. In most situations, the upper portion of the filter bed should be expanded approximately 10 to 30%. Of course, the extent of expansion will depend upon the particular dirt being removed and the specific gravity of the filter medium.

The upward flow of diluting liquid from flow lines 58 and 60 through the filter bed causes the upper portion of the bed to expand, thereby flushing interspersed particulate contaminants, lint-like contaminants, and any tramp oils therefrom. This liquid with the entrained contaminants flows out of the vessel 10 through opened valve V7 and flow line 66 into a tank 68. The contaminants may be separated from the liquid in tank 68 by conventional settling and skimming techniques, if desired.

It must be noted that the flow rate of the liquid upwardly through the vessel must be chosen and regulated to assure that only the contaminants, and not the filter medium, will flow out of the vessel 10. A particulate flow rate will be dependent upon such factors as: (a) media size; (b) media density; and (c) contaminant size and density. Accordingly, the flow rate must be great enough to adequately expand the bed and to remove the contaminants, yet not be so great that filter material will also be removed. One way of regulating the upward flow is to regulate manually adjustable valve V12 to regulate the amount of liquid discharged by the cleaning receptacle 52. Another manner of regulating this flow is to vary the amouht of liquid supplied by flow line 64. It will be understood, of course, that some filter material may flow out of the vessel 10 during the backwash cycle. The primary concern is to minimize any such loss.

Once a sufficient amount of dirt has been removed from the bed, the backwashing and withdrawing cycles are terminated and the bed is reformed for further filtration flow. This procedure would include closing valve V8 and purging the filter granules from flow line 62 by pump P2. Liquid may be introduced into flow line 62 from a suitable source to assist in purging the filter material, by opening valve V14. After valve V8 is closed and liquid is not being withdrawn through flow line 62, it may also be necessary to close valve V13 so that filter material in the upper portion of the bed is not flushed out of housing 10. After all the filter material has been returned to the vessel, pump P2 is de-energized and valves V7, V9, V10, V12, and V14 are closed. Valves V1, V2 and V11 may then be reopened and pump P1 energized to initiate filtration flow of dirty liquid from tank 32 as previously described.

In operation, the invention includes a first step of agitating a filter medium bed to break up the accumulated, agglomerated particulates. This may be accomplished by flowing the filter material and contaminants in a liquid slurry through a continuous flow path which includes flow line sections 50, 56, 58 and 60. Subsequent to the agitating step, the filter bed is substantially reformed with lint and finer, light contaminants in the upper portion of the bed, and heavier, larger comtaminant particles in the lower portion of the bed. Next, diluting liquid is injected into the filterhousing through flow lines 58 and 60 from supply line 64 to expand and backwash the upper portion of the filter bed. Simultaneously, filter material is withdrawn from the bottom of the bed through flow line 62 and passed over a suitable cleaning element 52, where the larger particulate contaminants are separated from the filter granules, which are then returned to the filter housing by flow lines 58 and 60 in a diluting liquid flow.

It will be understood that the foregoing description of the present invention is merely exemplary, and that various modifications may be made. For example, agitation of the filter bed to fragment and break up the filter cake may be accomplished in a variety of ways without departing from the scope of the invention.

Having fully and completely described my invention, I now claim:

1. In a method of filtering particulate and lint-like contaminants from a dirty liquid by passing the dirty liquid through a bed of granular filter medium contained within a housing wherein the contaminants are accumulated and at least a portion of the particulate contaminants form an agglomeration with the filter granules, the improvement of renewing the bed of filter medium after the accumulation of an appreciable amount of contaminants therein, by the steps of: expanding and violently agitating the filter bed, thereby breaking up the agglomeration into filter granules and particulate contaminants; reforming the filter bed with the lint-like contaminants predominantly in the upper portion of the reformed bed, the larger of the broken-up particulate contaminants in the lowermost portion of the bed, and the remainder of the particulate contaminants interspersed throughout the bed; introducing diluting liquid into the bed at a position between the upper and lower surfaces of the bed; simultaneously (a) flowing a portion of the diluting liquid upwardly through only that portion of the bed which is above the point of diluting liquid introduction at an appreciable velocity to expand and to upwardly backwash interspersed particulates and lint-like contaminants therefrom; and (b) separately withdrawing from the housing at a point below the point of liquid introduction a slurry of granular filter material and interspersed particulates in admixture with the remainder of the diluting liquid, flowing the slurry in a continuous flow path which includes a cleaning element where at least a portion of the interspersed particulates are removed from the liquid mixture flow, and returning the withdrawn filter material back to the filter bed in the diluting liquid flow; terminating the diluting liquid flow after the filter bed has been sufficiently cleaned; and reforming the bed for further filtration flow of dirty liquid.

2. The method as defined in claim 1, wheerein the agitating step is characterized by (a) flowing liquid upwardly through the bed at an appreciable velocity sufficient to slurry the filter bed and entrapped contaminants, and (b) flowing the slurry of liquid, contaminants and filter granules in a continuous flow path which is in part exterior to the housing.

3. The method as defined in claim 1, characterizied by introducing the diluting liquid flow at a position spaced from the bottom of the bed by a distance which is approximately from about 10 to 25% of the total vertical depth of the bed.

4. The method as defined in claim 1, wherein the amount of diluting liquid introduced into the bed is selected in relationship to the filter medium so that the portion of the diluting liquid which flows upwardly has a velocity sufficient to (a) expand the upper portion of the bed and (b) upwardly flush interspersed particulates and lint-like contaminants from the expanded portion of the bed without flowing filter granules from the filter bed.

5. In a method of rejuvenating a bed of granular filter medium which has become at least partially clogged by the accumulation of particulate and lint-like contaminants as a result of contaminated liquid flow therethrough, said particulate contaminants being at least partially agglomerated, and said bed being normally maintained in a filter housing, the steps of:

1. flowing diluting liquid upwardly through the bed at an appreciable velocity sufficient to expand the filter bed and to form a liquid slurry of the filter granules and contaminants;
2. flowing the liquid slurry in a continuous flow path which is in part exterior to the filter housing, thereby agitating the slurry and fragmenting at least a portion of the agglomerated particulates into smaller particulates ranging in size;
3. returning the slurry to the filter housing and at least partially reforming the bed with (a) a principal portion of the larger particulates interspersed in the lowermost portion of the bed, (b) the remainder of the particulates primarily interspersed in the remaining upper portion of the bed, and (c) said lint-like contaminants predominently interspersed in the remaining upper portion of the bed; and
4. simultaneously, (a) introducing diluting liquid into the reformed bed at a point above the bottom of the bed; (b) flowing only a portion of the diluting liquid upwardly through the upper portion of the bed at a rate sufficient to expand and rejuvenate that portion of the bed by backwashing at least a portion of the interspersed particulate and lint-like contaminants therefrom; (c) withdrawing from the bottom portion of the bed a liquid mixture of filter medium with interspersed particulates and the remainder of the diluting liquid and (d) flowing the withdrawn liquid mixture through a cleaning element exterior to the filter housing, removing at least a portion of the particulates from the withdrawn mixture in the cleaning element and returning the withdrawn filter medium back to the filter housing.

6. The method as defined in claim 5, wherein Step (4) (d) is characterized by flowing the withdrawn liquid mixture past a perforated surface in the cleaning element, and removing the larger particulates by flowing those particulates in a liquid flow through apertures in the perforated surface while flowing the filter medium in a liquid mixture past the apertures and back to the bottom portion of the filter housing.

7. The method as defined in claim 6, wherein the liquid slurry is flowed through the cleaning element in Step (2) without withdrawing contaminants through the apertures in the perforated surface.

8. The method as defined in claim 5, wherein Step (2) is characterized by flowing the liquid slurry from an upper portion of the filter housing and through a closed loop flow line which includes the cleaning element, and wherein Step (3) is characterized by flowing the slurry back to a bottom portion of the filter housing.

9. The method as defined in claim 8, wherein Step (4) of claim 5 is characterized by returning the withdrawn filter medium to the filter housing in the diluting liquid of Step (4) (a), and wherein the filter medium and particulates are withdrawn from the filter housing in Step (4) (c) beneath the point at which the filter medium is returned in the diluting liquid, so that substantially only the lower portion of the filter bed is withdrawn during Step (4) (c) for flow through the cleaning elements in order to reduce the likelihood of lint-like contaminants becoming entangled in the cleaning element.

10. The method as defined in claim 9, characterized by the withdrawn filter medium being returned to the filter housing at a plurality of radial positions.

11. In a method of cleaning a bed of granular filter medium which has accumlated contaminants as a result of dirty liquid flow therethrough, said contaminants including particulates and lint, said accumulated particulates becoming at least partially agglomerated in the filter bed, and said bed being normally maintained in a filter housing, the steps of:

injecting diluent liquid into the bottom of said bed at an appreciable velocity sufficient to form a flowable mixture of filter granules and contaminants; flowing the mixture from an upper portion of the housing and through a closed flow path which is in part exterior to the filter housing, thereby agitating the mixture and breaking up at least a portion of the agglomerated contaminants into smaller particulates;

returning the mixture to a lower portion of the filter housing and reforming the bed with the lint being interspersed in the uppermost portion of the bed, and the particulates being interspersed throughout the filter bed; and simultaneously (a) withdrawing filter medium with interspersed particulates in a liquid mixture from the bottom portion of the bed, (b) flowing the withdrawn liquid mixture in a continuous cycle through a cleaning receptacle exterior to the filter housing, removing at least a portion of the particulates from the withdrawn mixture in the cleaning receptacle to renew the withdrawn filter medium and returning the renewed filter medium back to the filter housing at a position which is spaced from the bottom of the bed. (c) introducing liquid into the bed at approximately the same vertical position where the withdrawn filter medium is returned to the bed. (d) flowing at least a portion of the introduced liquid upwardly through the upper portion of the bed at a rate sufficient to expand the bed and to backwash at least a portion of the interspersed particulates and lint therefrom.

12. In a method of rejuvenating a bed of granular filter medium which has become at least partially clogged by the accretion of particulate and lint-like contaminants as a result of contaminated liquid flow therethrough, said particulate contaminants being interspersed throughout the bed, said lint-like contaminants being predominantly in the upper portion of the bed, and said bed being normally maintained in a filter housing, the steps of:

simultaneously (a) introducing backwash liquid into the bed at a point above the bottom of the bed; (b) flowing a portion of the backwash liquid upwardly through that portion of the bed which is above the point of liquid introduction at a rate sufficient to expand and rejuvenate that portion of the bed by backwashing at least a portion of the interspersed particulates and lint-like contaminants therefrom; (c) withdrawing filter medium with interspersed, particulates and the remainder of the introduced liquid from the bottom of the bed in a flowable liquid slurry; and (d) flowing the withdrawn liquid slurry through a cleaning receptacle exterior to the filter housing, removing at least a portion of the particulates from the withdrawn mixture in the cleaning receptacle to rejuvenate the withdrawn filter medium and returning the rejuvenated filter medium back to the filter housing with the introduced flow of backwash liquid; and subsequently terminating the introduction of backwash liquid and reforming the filter bed for further filtration flow of dirty liquid.

13. In a method of removing accreted contaminants from a bed of granular filter material confined in a housing of appreciable vertical extent, the accreted contaminants including lint and solid contaminant particles, and the bed and contaminants having formed an agglomeration in the housing, the steps of:

1. initially injecting backwash liquid under pressure into the housing to break up the agglomeration;

2. terminating the injection of initial backwash liquid;

3. injecting additional backwash liquid at a point intermediate the vertical extent of the housing;

4. simultaneously (a) flowing a portion only of said additional backwash liquid upwardly to float lint and contaminant particles upwardly from the bed, and (b) withdrawing the remainder of the additional backwash liquid from the housing at a location below the point of additional backwash injection, the withdrawn backwash liquid having slurried therein granular filter material and contaminant particles from the lower regions of the housing.

5. flowing the withdrawn slurry through a flow path exterior to the housing, said flow path having a cleaning element interposed therein;

6. withdrawing at least some of the contaminant particles from the slurry at said cleaning element;

7. returning to the housing the slurry less the withdrawn contaminants; and 8. terminating the injection of additional backwash liquid to reconstitute the bed after steps 4,5, and 6 have removed sufficient amounts of lint and contaminants from the filter material.

14. In a filtration apparatus having a bed of granular filter medium which is maintained in a filter housing during filtration flow, the improvement of a system for rejuvenating the filter bed after it has accumulated particulate and lint comtaminants as a result of dirty liquid flow therethrough, said accumulated particulate contaminants becoming at least partially agglomerated due to the accumulation in the bed; said system including:

a closed recirculation flow path loop exterior to the housing, said flow path including an outlet at an upper portion of the housing, a return inlet at a lower portion of a housing, and a conduit interconnecting the outlet and return inlet;

liquid supply means for injecting diluent liquid into the bottom of the bed of granular filter medium at an appreciable velocity sufficient (a) to expand the bed, (b) to form a flowable slurry mixture of filter granules and contaminants, and (c) to flow the slurry out of the upper portion of the filter housing and into the closed recirculation flow path for agitating the mixture and breaking up at least a portion of the agglomerated particulates;

pump means in the recirculation flow conduit for returning the slurry to the filter housing through the recirculation inlet so that the bed may be reformed, the lint contaminants being interspersed in the upper portion of the reformed bed and the particulates interspersed throughout the filter bed;

a second closed flow path exterior to the housing forming a loop which includes (a) an outlet at the bottom of the housing, (b) a return inlet positioned above the bottom of the housing, (c) a flow conduit interconnecting the outlet and inlet, and (d) a cleaning element in the flow conduit;

means for injecting liquid into the conduit of the second flow path for flow through the return inlet at an appreciable velocity (a) to expand and substantially suspend that portion of the filter bed above the return inlet, (b) to flush particulate and lint contaminants from the expanded portion of the filter bed, (c) to flow filter granules and interspersed contaminants in a liquid mixture into the outlet of the second closed path, (d) to remove contaminants in a liquid flow at the cleaning element, and (e) to return the withdrawn granules to the filter housing from the second flow path after passing through the cleaning element.

15. The filtration apparatus as defined in claim 14, characterized by said closed flow paths including a common flow line portion, and further characterized by a single common return for said flowline common portion inlet, said cleaning element being in the common flow line portion.

16. The filtration apparatus as defined in claim 15, characterized by said common return inlet being spaced from the bottom of the filter bed by a distance of up to above 30% of the bed depth.

* * * * *